US00RE46247E

(19) United States
(12) Reissued Patent
Hanson et al.

(10) Patent Number: US RE46,247 E
(45) Date of Reissued Patent: Dec. 27, 2016

(54) BUMPER OF A TRUCK

(71) Applicant: Caterpillar Inc., Peoria, IL (US)

(72) Inventors: Eric J. Hanson, Valparaiso, IN (US); Joseph F. deNatale, Greensboro, NC (US)

(73) Assignee: Caterpillar Inc., Peoria, IL (US)

(21) Appl. No.: 29/501,140

(22) Filed: Sep. 2, 2014

Related U.S. Patent Documents

Reissue of:

(64) Patent No.: Des. 655,652
Issued: Mar. 13, 2012
Appl. No.: 29/381,440
Filed: Dec. 20, 2010

(51) LOC (10) Cl. ..... 12-16

(52) U.S. Cl.
USPC ..... D12/169

(58) Field of Classification Search
USPC ..... D12/86, 90, 91, 92, 163, 164, 169, 171,D12/196, 216; 180/68.4, 68.6; 293/102, 112, 293/113, 115, 117, 120; 296/180.1, 180.2

(Continued)

(56) References Cited

U.S. PATENT DOCUMENTS

D248,156 S * 6/1978 Tixier ..... D12/169
D307,126 S 4/1990 Allendorph et al.

(Continued)

*Primary Examiner* — Darlington Ly
(74) *Attorney, Agent, or Firm* — Finnegan, Henderson, Farabow, Garrett & Dunner, LLP

(57) CLAIM

The ornamental design for a bumper of a truck, as shown and described.

DESCRIPTION

FIG. 1 is a [left, front perspective view of a bumper of a truck showing our new design, the portions of the truck shown in broken lines are for illustrative purposes only and form no part of the claimed design] *left-side and front perspective view of a bumper of a truck showing our new design, wherein the bumper is shown installed on a truck body*;
FIG. 2 is an enlarged [left, front perspective view thereof, without the truck portions shown] *left-side and front perspective view thereof, wherein the bumper is shown independently without the truck body*;
FIG. 3 is an enlarged left side elevational view thereof;
FIG. 4 is an enlarged top plan view thereof;
FIG. 5 is an enlarged front elevational view thereof;
FIG. 6 is an enlarged rear elevational view thereof;
FIG. 7 is an enlarged bottom plan view thereof;
FIG. 8 is an enlarged exploded left, front perspective view thereof;
FIG. 9 is an enlarged exploded left side elevational view thereof;
FIG. 10 is an enlarged exploded top plan view thereof;
FIG. 11 is an enlarged exploded front elevational view thereof;
FIG. 12 is an enlarged exploded rear elevational view thereof; and,
FIG. 13 is an enlarged exploded bottom plan view thereof.
The broken lines of the figures showing additional portions of the truck are included for the purpose of illustrating environmental structure and form no part of the claimed design.

1 Claim, 13 Drawing Sheets

Matter enclosed in heavy brackets [ ] appears in the original patent but forms no part of this reissue; matter printed in italics indicates the additions made by reissue.

Amended

(58) Field of Classification Search
CPC ..... B60K 11/08; B60R 13/005; B60R 19/18; B60R 19/48; B60R 19/52; B60R 2019/486; B60R 2019/505; B60R 2019/525; B60R 2019/527; B60R 2019/1886; B62D 25/084; B29C 45/0081; B29C 2031/738; B29C 2045/0093
See application file for complete search history.

(56) References Cited

U.S. PATENT DOCUMENTS

D307,254 S * 4/1990 Koske et al. ..... D12/169
D327,045 S * 6/1992 Levine ..... D12/169
D328,273 S 7/1992 McGrew, Jr. et al.
D335,272 S 5/1993 Allendorph et al.
D364,371 S * 11/1995 Ray et al. ..... D12/169
D366,638 S 1/1996 Tucker et al.
D367,027 S 2/1996 Onopa
D381,946 S * 8/1997 Delashaw et al. ..... D12/167
D382,841 S 8/1997 Norwood et al.
D391,908 S 3/1998 Allendorph et al.
D394,035 S 5/1998 Stosel et al.
D394,624 S 5/1998 Allendorph et al.
D412,689 S 8/1999 Onopa
D426,800 S 6/2000 Zimmerman
D429,669 S * 8/2000 Cook et al. ..... D12/169
D437,574 S 2/2001 Beigel
D445,073 S * 7/2001 Tirey et al. ..... D12/169
D450,277 S 11/2001 Onopa
D455,381 S 4/2002 Maher et al.
D458,197 S 6/2002 Maher et al.
D458,565 S * 6/2002 Maher et al. ..... D12/169
D460,030 S * 7/2002 Duckett et al. ..... D12/169
D466,450 S 12/2002 Maher et al.
D475,663 S * 6/2003 Chiang ..... D12/169
D475,664 S * 6/2003 Chiang ..... D12/169
D475,949 S * 6/2003 Honer ..... D12/96
D476,929 S * 7/2003 Dozier et al. ..... D12/169
D478,027 S * 8/2003 Chiang ..... D12/169
D478,028 S * 8/2003 Chiang ..... D12/169
D482,302 S * 11/2003 Dozier et al. ..... D12/169
D483,707 S * 12/2003 Satou ..... D12/169
D491,848 S * 6/2004 Metros et al. ..... D12/169
D492,628 S * 7/2004 Bond et al. ..... D12/169
D494,898 S * 8/2004 Metros et al. ..... D12/169
D497,577 S * 10/2004 Metros et al. ..... D12/169
D502,897 S 3/2005 Delashaw et al.
D502,901 S 3/2005 Delashaw et al.
D504,642 S 5/2005 Perfetti et al.
D518,424 S * 4/2006 Clark et al. ..... D12/169
D519,067 S * 4/2006 Steere et al. ..... D12/169
D523,793 S 6/2006 Beigel et al.
D530,653 S * 10/2006 Angelo et al. ..... D12/169
D531,940 S * 11/2006 McCuller et al. ..... D12/169
D535,225 S * 1/2007 Tsai ..... D12/169
D536,287 S 2/2007 Beigel et al.
D537,389 S * 2/2007 Beigel et al. ..... D12/169
D537,761 S 3/2007 Beigel et al.
D540,725 S 4/2007 Gunter et al.
D545,248 S * 6/2007 Angelo et al. ..... D12/169
D556,654 S 12/2007 Lee et al.
D560,144 S * 1/2008 Tant et al. ..... D12/169
D561,647 S * 2/2008 Simons et al. ..... D12/96
D571,696 S 6/2008 Rosen et al.
D579,828 S * 11/2008 Bucher et al. ..... D12/163
D584,664 S * 1/2009 Johnson et al. ..... D12/169
D589,846 S 4/2009 Tanaka
D621,752 S * 8/2010 Angelo et al. ..... D12/169
D632,233 S * 2/2011 Iuchi ..... D12/169
D633,419 S * 3/2011 Peltola et al. ..... D12/169
D634,246 S * 3/2011 Aris et al. ..... D12/169
D645,799 S * 9/2011 Beigel et al. ..... D12/169
D647,013 S * 10/2011 Ito et al. ..... D12/169
D655,652 S * 3/2012 Hanson et al. ..... D12/169
D686,545 S * 7/2013 Peltola et al. ..... D12/169
D709,807 S * 7/2014 Heilaneh et al. ..... D12/169
2010/0181786 A1 * 7/2010 Tejler et al. ..... 293/130

* cited by examiner

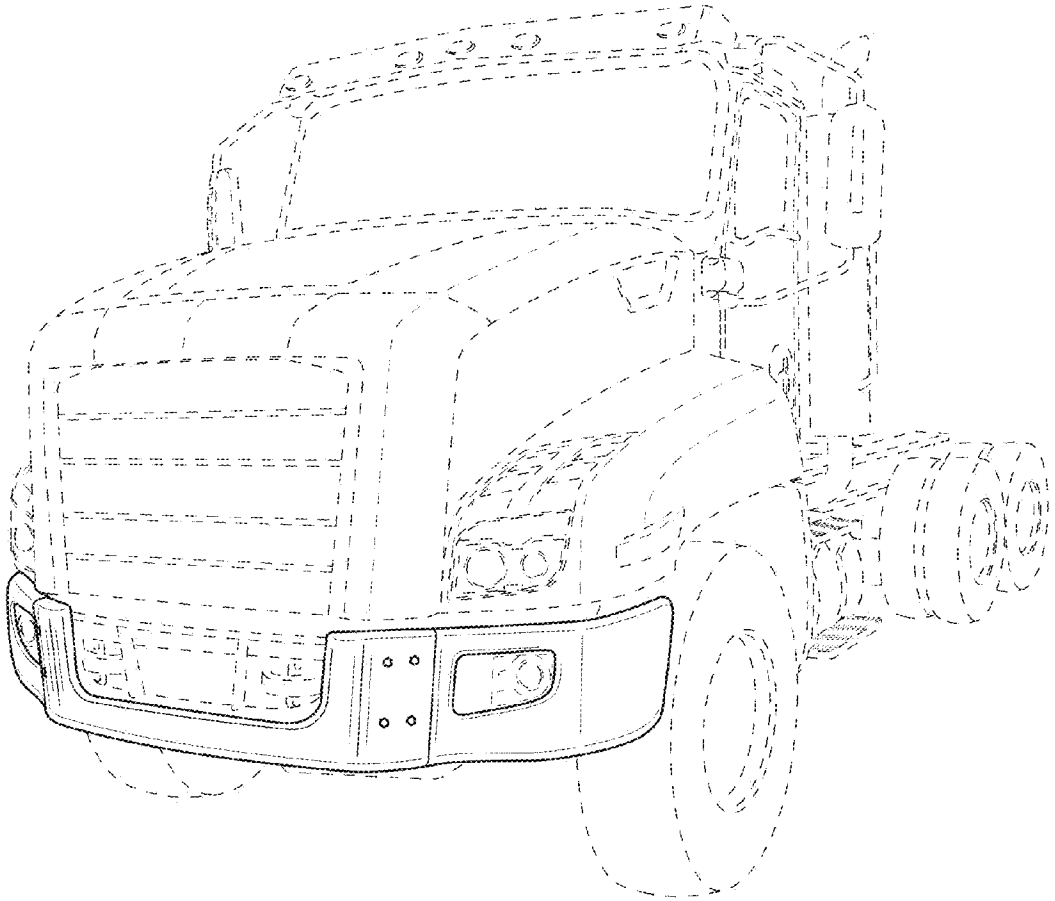
FIG. 1
Amended

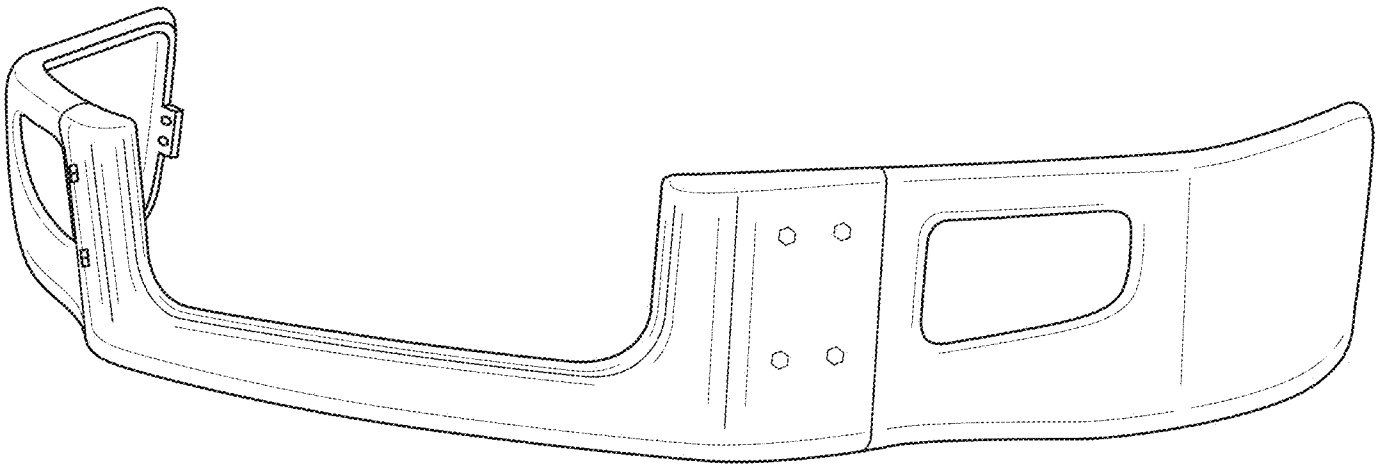
FIG. 2
Amended

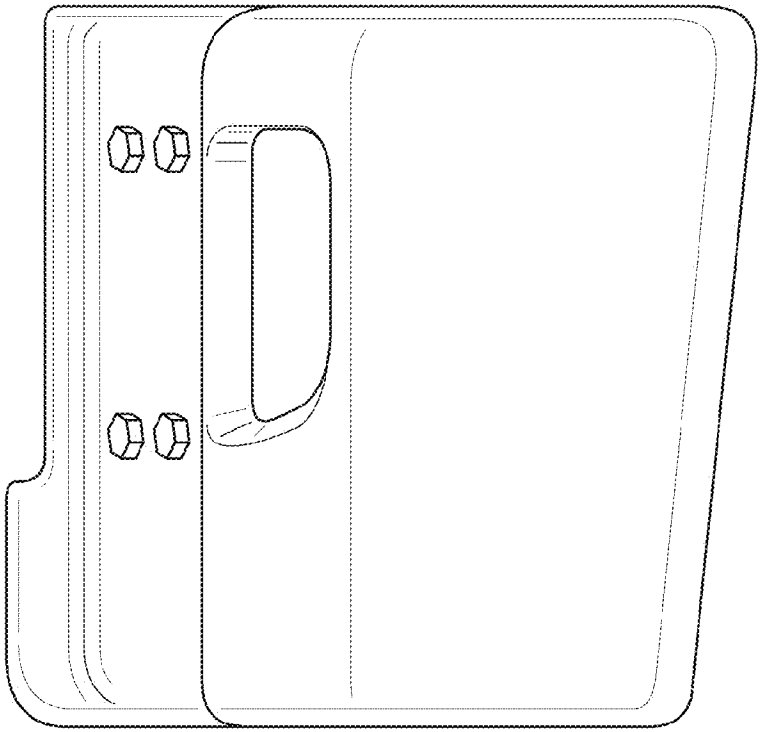
FIG. 3
Amended

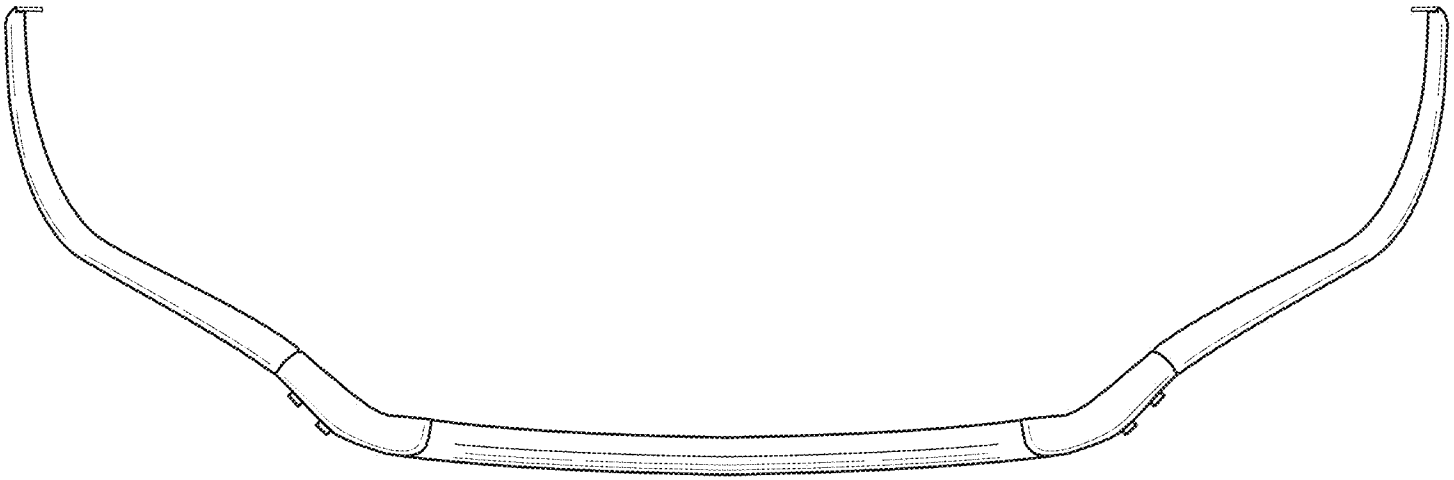
FIG. 4
Amended

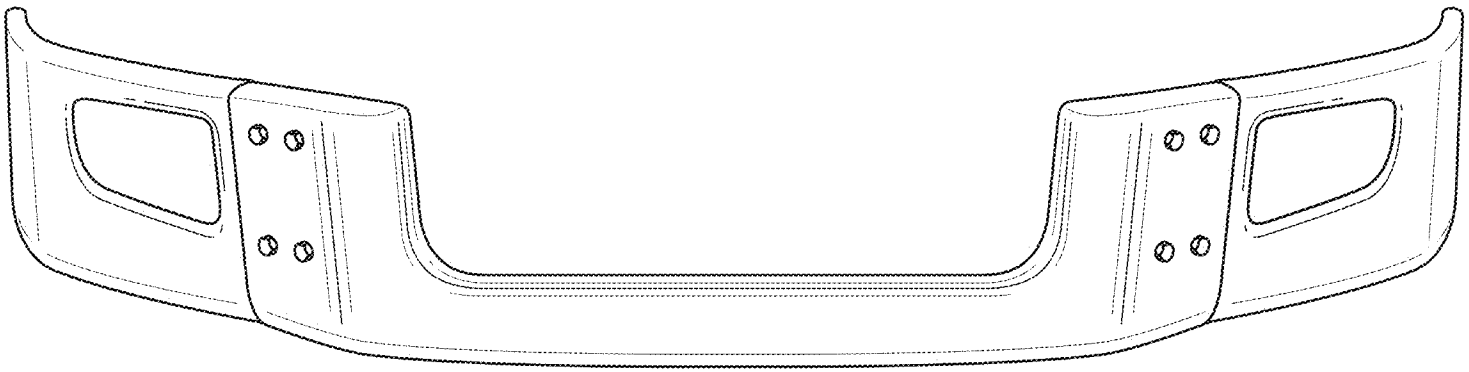
FIG. 5
Amended

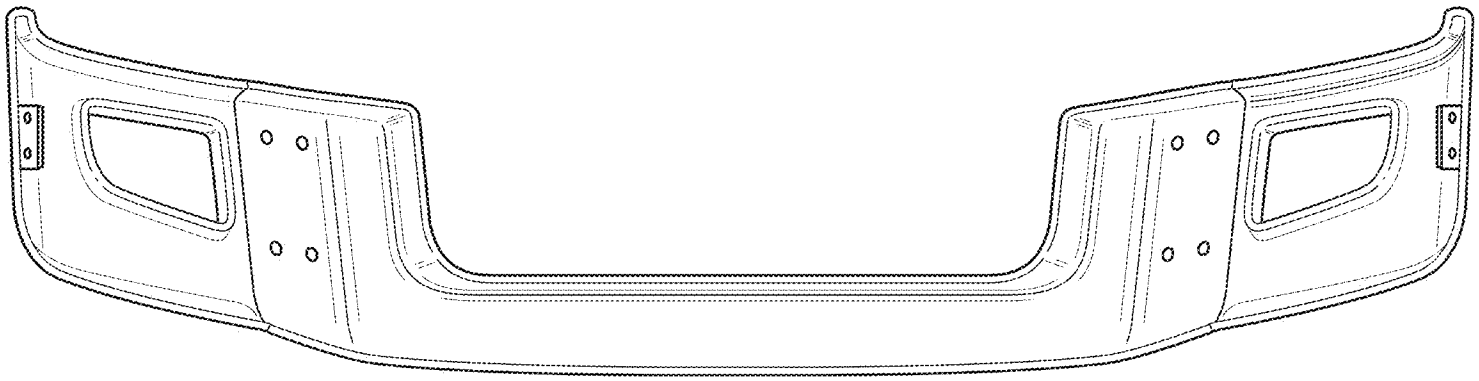
FIG. 6
Amended

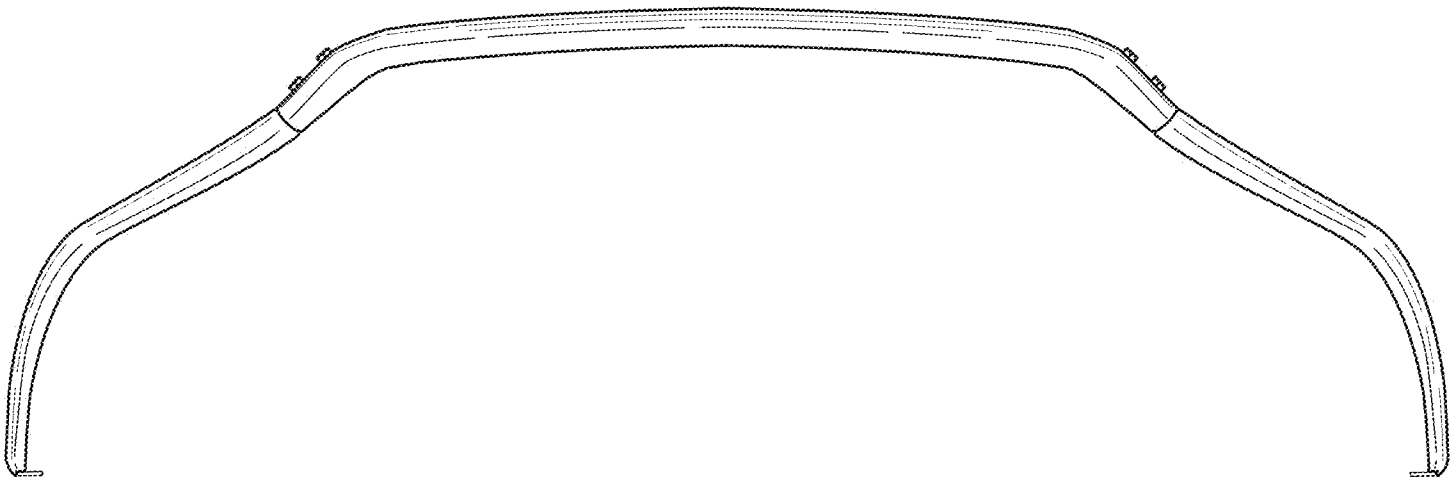
FIG. 7
Amended

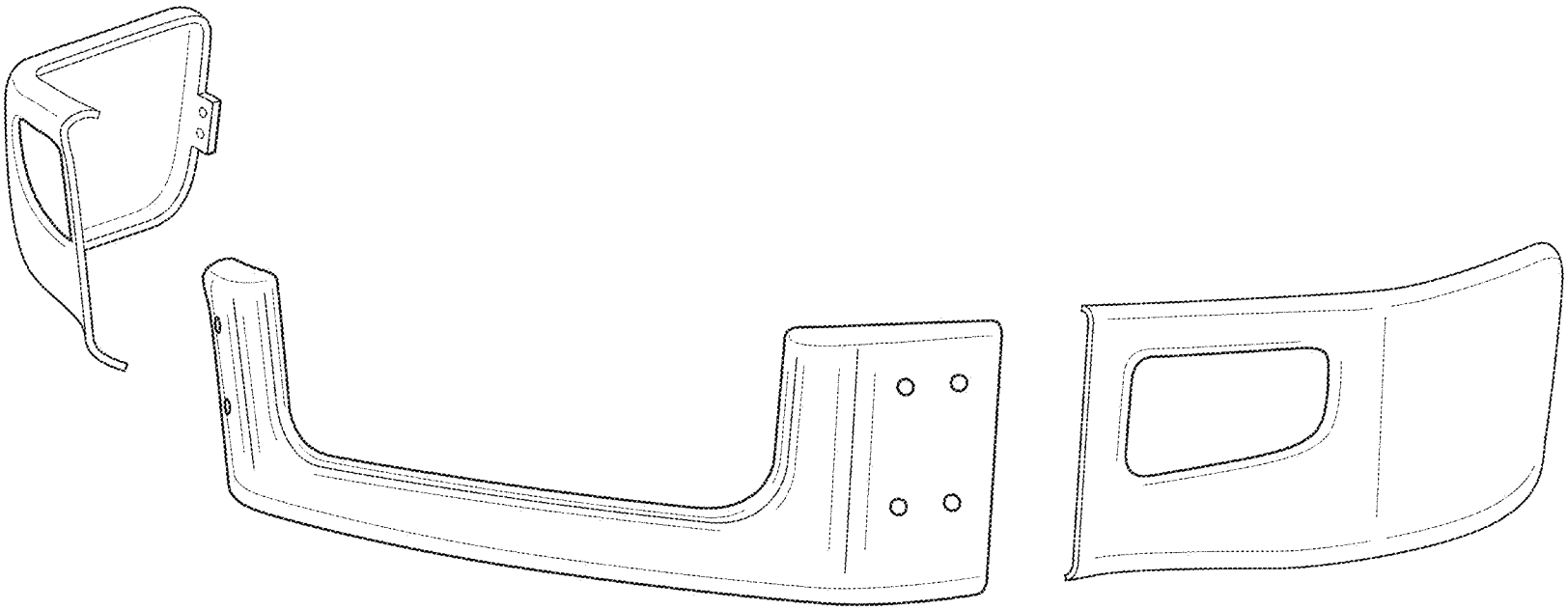
FIG. 8
Amended

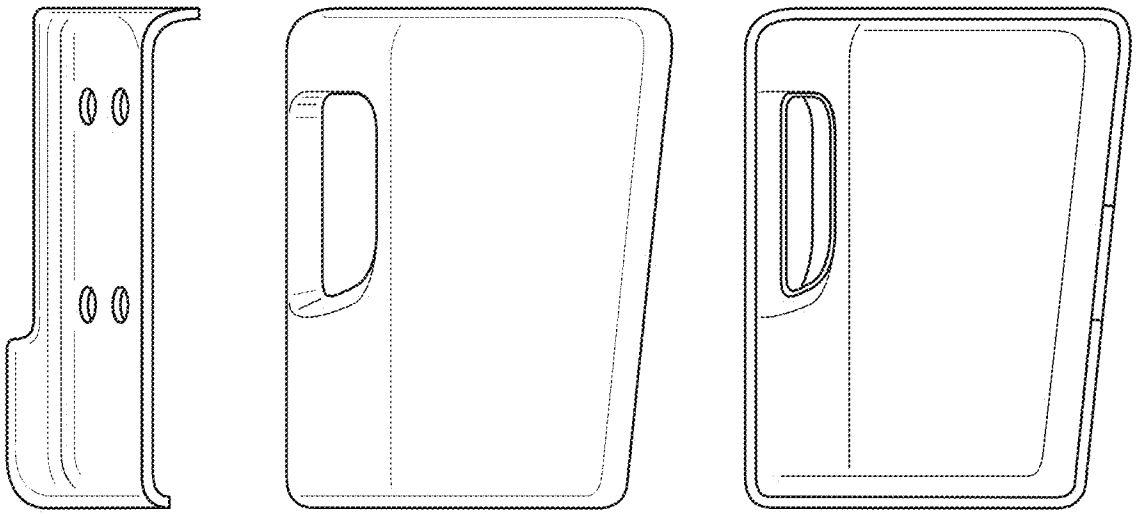
FIG. 9
Amended

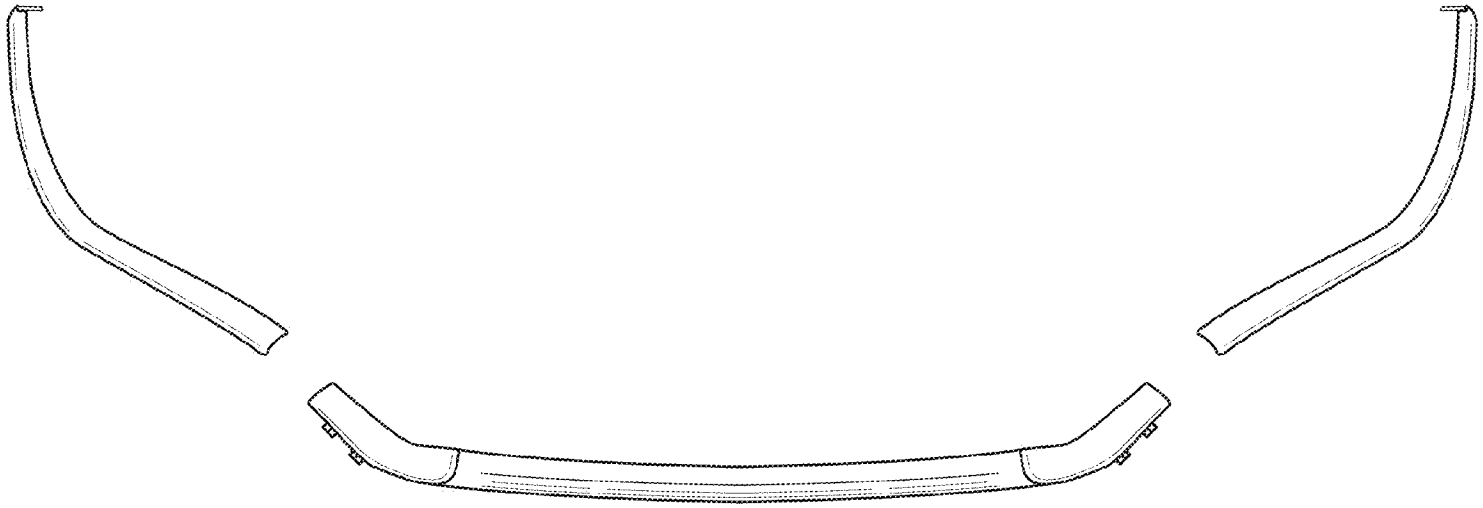
FIG. 10
Amended

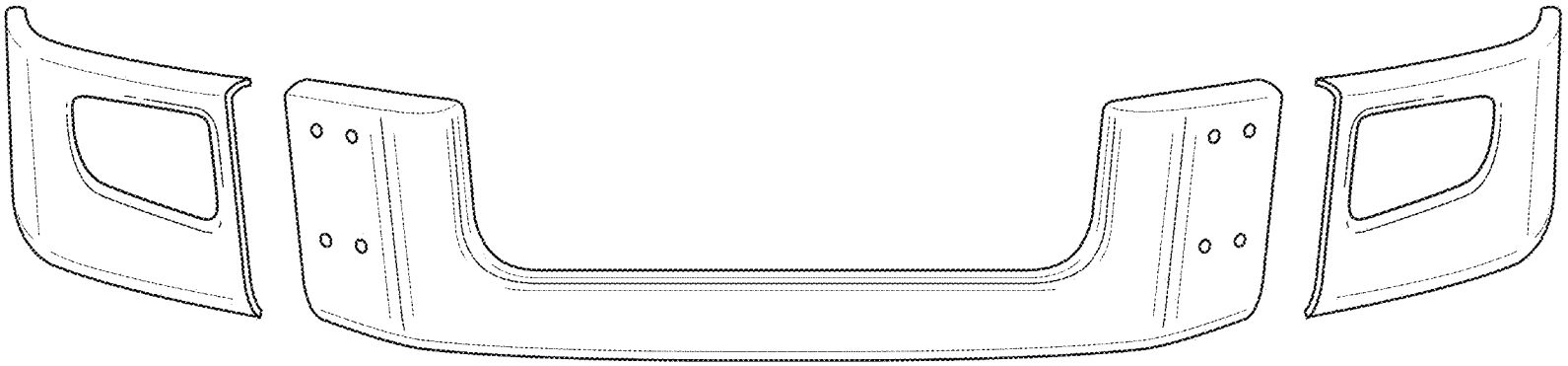
FIG. 11
Amended

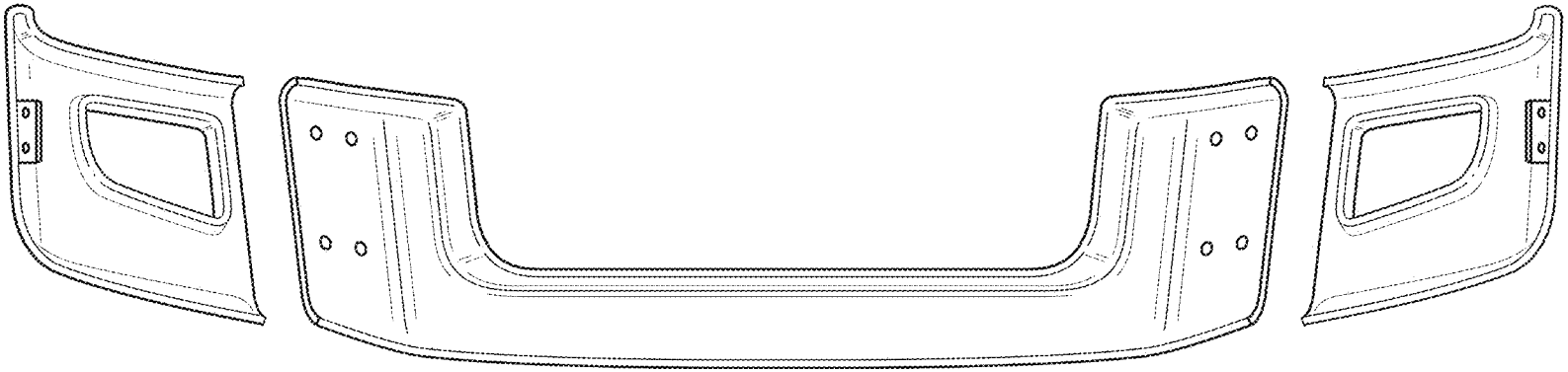
FIG. 12
Amended

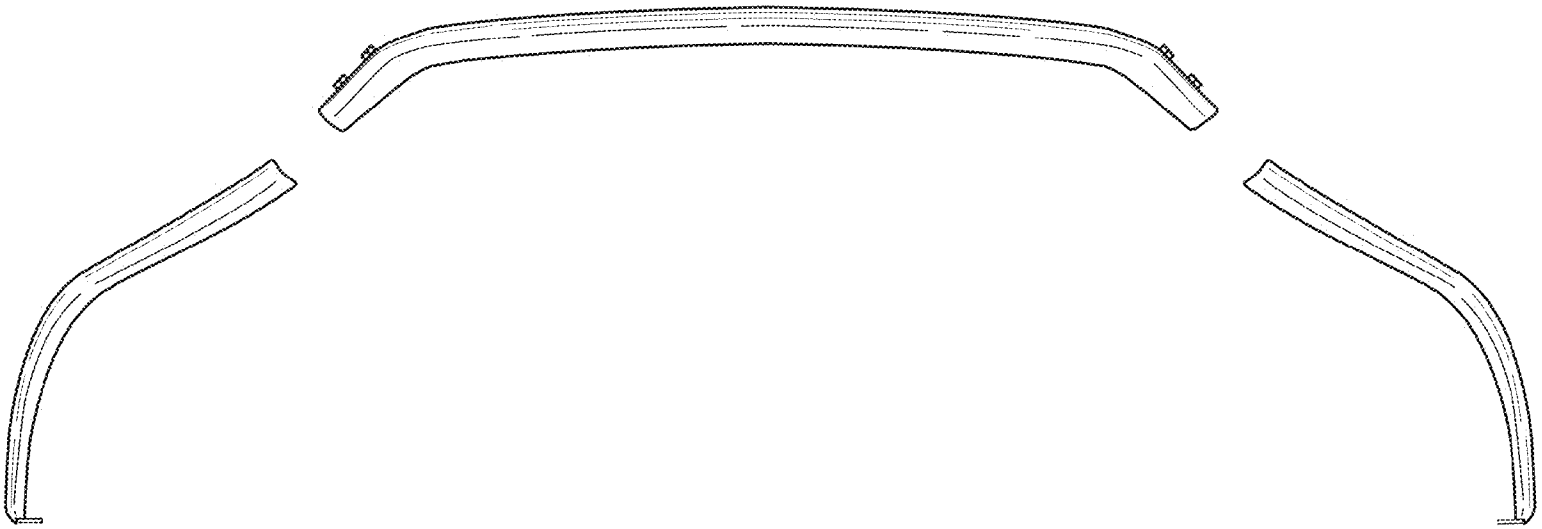
FIG. 13
Amended